(12) United States Patent
Shank et al.

(10) Patent No.: US 7,616,108 B2
(45) Date of Patent: Nov. 10, 2009

(54) VEHICLE LIGHT SYSTEM

(75) Inventors: David Shank, Hersey, MI (US); Edward Cox, Marion, MI (US); John Washeleski, Cadillac, MI (US)

(73) Assignee: Nartron Corporation, Reed City, MI (US)

( * ) Notice: Subject to any disclaimer, the term of this patent is extended or adjusted under 35 U.S.C. 154(b) by 370 days.

(21) Appl. No.: 11/649,692

(22) Filed: Jan. 4, 2007

(65) Prior Publication Data

US 2008/0068201 A1    Mar. 20, 2008

Related U.S. Application Data

(60) Provisional application No. 60/840,303, filed on Aug. 25, 2006.

(51) Int. Cl.
*B60Q 11/00* (2006.01)

(52) U.S. Cl. .................................. 340/458; 340/664

(58) Field of Classification Search ................ 340/458, 340/657, 664
See application file for complete search history.

(56) References Cited

U.S. PATENT DOCUMENTS

| | | | |
|---|---|---|---|
| 4,841,198 A | | 6/1989 | Wilhelm |
| 4,866,390 A | * | 9/1989 | Butchko ............... 340/458 |
| 5,247,280 A | * | 9/1993 | Brooks ................. 340/458 |
| 5,517,064 A | * | 5/1996 | Murakami ............. 340/458 |
| 5,629,680 A | * | 5/1997 | Makhija ............... 340/664 |
| 6,002,330 A | * | 12/1999 | Brandt ................. 340/468 |
| 6,160,475 A | * | 12/2000 | Hornung et al. ....... 340/458 |

\* cited by examiner

*Primary Examiner*—John A Tweel, Jr.
(74) *Attorney, Agent, or Firm*—Tarolli, Sundheim, Covell & Tummino LLP

(57) ABSTRACT

One embodiment of the present application includes a vehicle illumination system. The vehicle illumination system comprises an input keypad configured to receive at least one input provided by a user. The vehicle illumination system also comprises a controller configured to receive input commands provided by the input keypad and to sequentially control a state of a plurality of output device drivers corresponding to a respective plurality of vehicle lamps. The vehicle illumination system further comprises overvoltage protection circuitry configured to continuously monitor an electrical signal associated with each of the plurality of output device drivers relative to respective over-current condition thresholds and a summation over-current condition threshold. The summation over-current threshold can be less than a sum of the respective over-current condition thresholds associated with each of the plurality of outputs.

40 Claims, 11 Drawing Sheets

VEHICLE LIGHT SYSTEM

CROSS REFERENCE TO RELATED APPLICATIONS

This application claims the benefit of U.S. Provisional Application No. 60/840,303, which was filed Aug. 25, 2006, and entitled "Vehicle Light System", the entire contents of which are incorporated herein by reference.

FIELD OF THE INVENTION

The present invention concerns a motor vehicle lamp actuation system.

BACKGROUND

Several different methods have been developed for controlling vehicle lighting systems. The earliest models were strictly mechanical switches packaged in a single housing. This method can be difficult to actuate due to mechanical forces and sequences and the failure rate is high due to constant actuation and mechanical wear of the switch components. Protection circuitry consisted of a bi-metal switch that would break the battery line when a current overload condition was present. When an over-current mode existed, this solution would not resolve the problem quickly enough, causing excessive heating and possible damage to other components.

Another method was the use of solid state devices, which improved ease of use and increased the product life. While solid state devices provide rapid response for shutting down in an over-current condition, they were vulnerable to overvoltages which could cause the devices to fail.

SUMMARY

The disclosure concerns a motor vehicle lamp control method and control apparatus wherein a controller is configured to execute a control program and activate output circuitry comprising a plurality of lamp drivers having inputs coupled to the controller and outputs for actuating multiple motor vehicle lamps.

Circuitry coupled to the controller transmits lamp actuation commands to the controller, causing the controller to actuate the lamps. Overvoltage protection circuitry limits adverse effects of transient signals to avoid damage to the control apparatus.

One embodiment includes a method for controlling a vehicle lighting system. The method monitors an input keypad for at least one input provided by a user and provides an input command to a controller in response to the input. The method may also include continuously monitoring an electrical signal associated with each of a plurality of outputs associated with the controller and comparing the monitored electrical signal relative to respective over-current condition thresholds. The method may also sequentially control a state of the plurality of outputs with respect to each of a plurality of vehicle lamps.

The present invention has a programmable controller which implements a number of features.

DETAILED DESCRIPTION OF THE INVENTION

An exemplary embodiment provides hardware which prevents damage to a vehicle light system in the event faults occur. The exemplary embodiment removes power from lamp drivers during transients and load dumps, thus protecting them from damage. The exemplary embodiment allows a high voltage transient, up to 125 VDC, into an exemplary control system without damage occurring. The exemplary embodiment monitors the level of the battery input and enables the protecting circuit to disconnect the supply to output device drives when a preset voltage level is exceeded. The drives will continue to be disabled until the input voltage drops below a preset level thereby allowing the unit to return to normal operation.

Figure 1A:
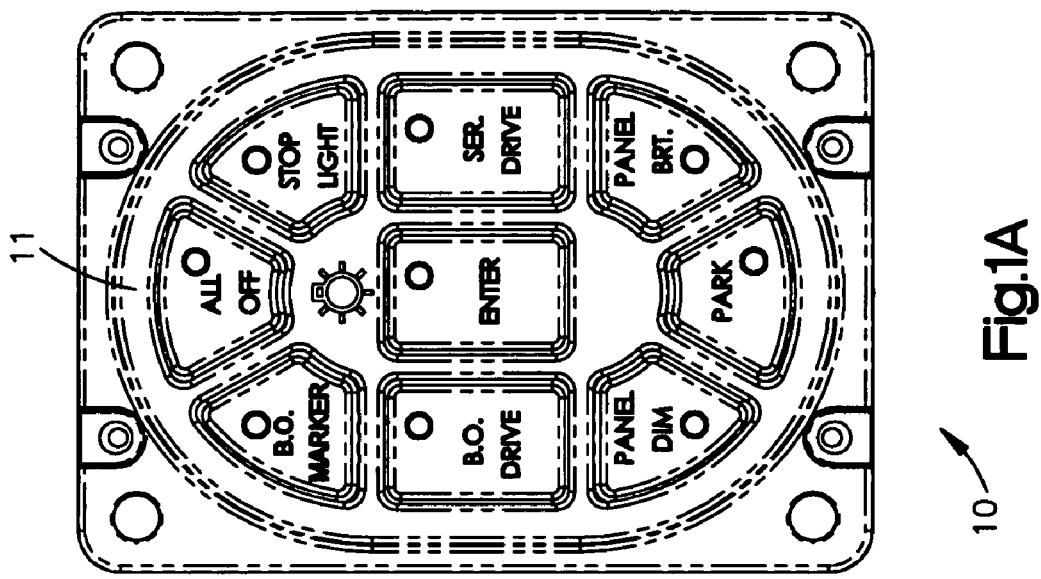
FIG. 1A illustrates a front view of the example of the input device for user actuation of motor vehicle lamps.
Figure 1:
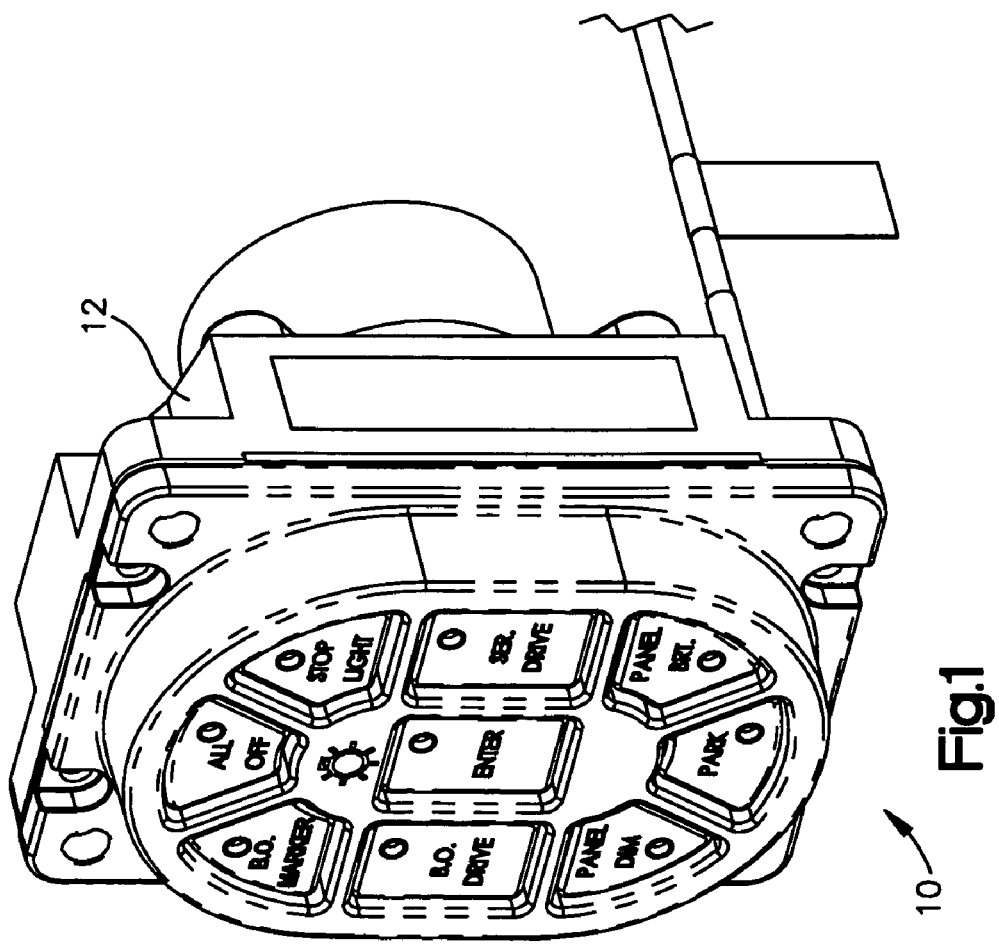
FIG. 1 illustrates a schematic perspective of an example of an input device for user actuation of motor vehicle lamps.

FIG. 1 depicts an exemplary embodiment of a user input interface 10 for actuating motor vehicle lamps. The input interface 10 includes a keypad 11, preferably made of an elastomeric material, secured within an enclosure 12, the enclosure 12 preferably made of die cast aluminum mounted to a motor vehicle dashboard (not shown). Within an interior of the enclosure 12, one or more printed circuit boards (PCBs) support circuitry described more fully below that selectively actuates headlamp, stop lamp, and other vehicle lamp bulbs (collectively referred to as vehicle lamps 14) of a motor vehicle.

FIG. 1A depicts a front view of the user input interface 10 for actuating the motor vehicle lamps 14. In the example of FIG. 1A, the keypad 11 includes nine separate user input keys, each identified with text that describes a respective lamp control function. The text for each of the nine user input keys can be illuminated by a backlight LED, as is explained in greater detail in the example of FIG. 6 below. In addition, each of the nine user input keys can include an indicator LED that can, for example, provide an indication to the user of a current illumination mode. For example, one or more of the indicator LEDs can be solidly illuminated to indicate that a given illumination mode is currently active, or can be flashed to indicate that the user input interface 10 is awaiting further user input after selecting a given illumination mode.

In the example of FIG. 1A, the keypad 11 demonstrates, via the text of the user input keys, different illumination modes which the user can initiate. For example, the illumination modes can be separated into mutually exclusive primary modes, such as "Blackout Drive", "Blackout Marker", "Stop Light", "Service Drive", "Park", and "All Off". Each of the primary modes can activate a certain combination of the vehicle lamps. In addition, the illumination modes can also include mutually exclusive auxiliary modes, such as "Panel Dim" and "Panel Bright", that can be implemented concurrently with one or more of the primary modes. Furthermore, in the example of FIG. 1A, the keypad 11 includes a centrally positioned "Enter" key that can allow the user to confirm selection of a selected illumination mode subsequent to pressing the user input key corresponding to the appropriate illumination mode.

Figure 4:
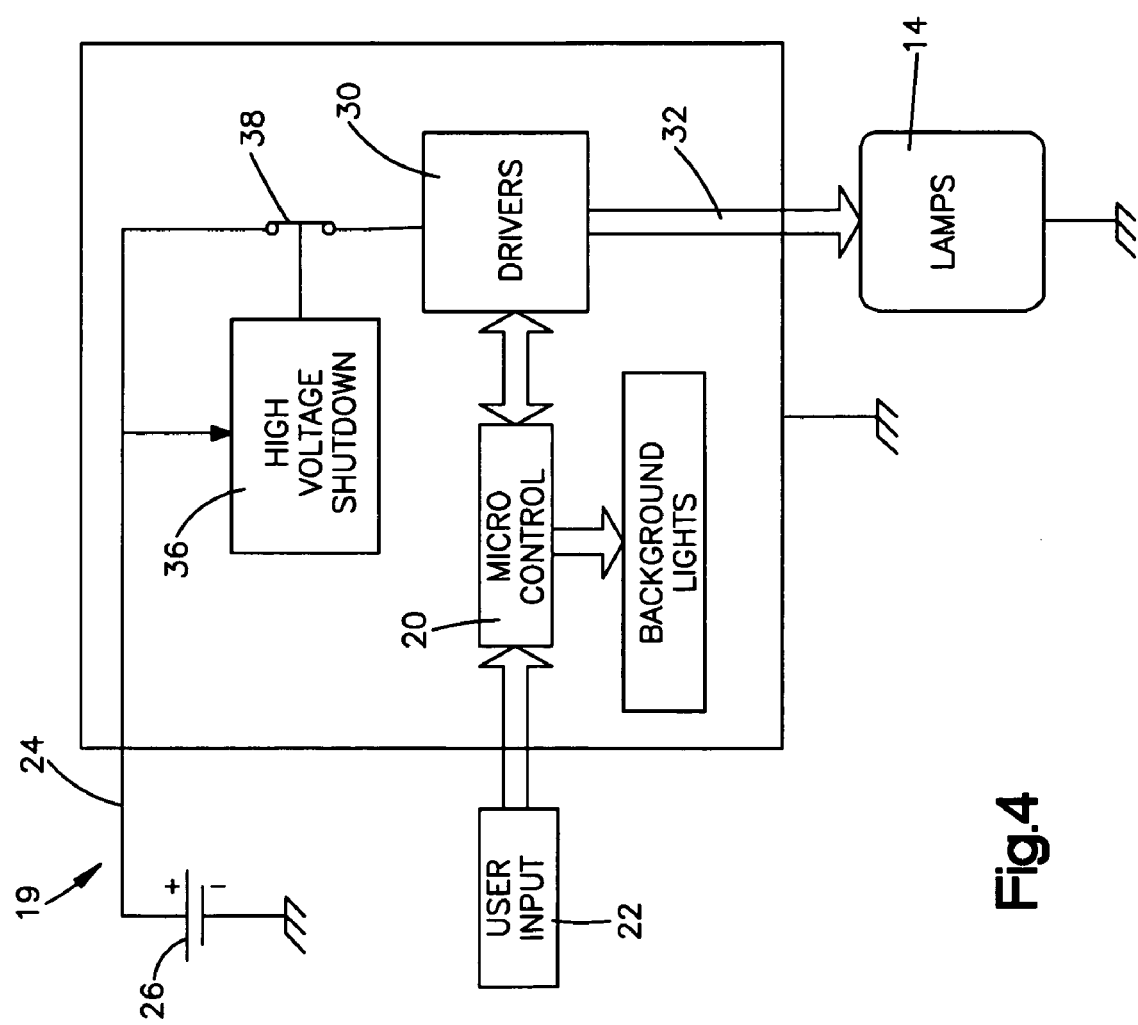
FIG. 4 illustrates an example of an overview of a vehicle light system.

FIG. 4 depicts a block diagram 19 of an exemplary control system that includes a microcontroller 20 which implements in software certain features for enhancing product performance and for providing more operator options. In addition to the microcontroller 20, the circuitry depicted in FIG. 4 includes a user interface input circuit 22 that issues commands to the microcontroller 20 based on user actuation of user input keys on the keypad 11. In response to the inputs at the keyboard 11, the microcontroller 20 issues commands to couple battery voltage at an input 24 from a battery 26 to driver circuits 30 having outputs 32 coupled to the vehicle lamps 14. The driver circuits 30 are protected from overvoltage conditions by a high voltage shutdown circuit 36 which selectively maintains a switch 38 in an open or closed state depending on the status of the voltage sensed at the input 24 from the battery.

Figure 2:
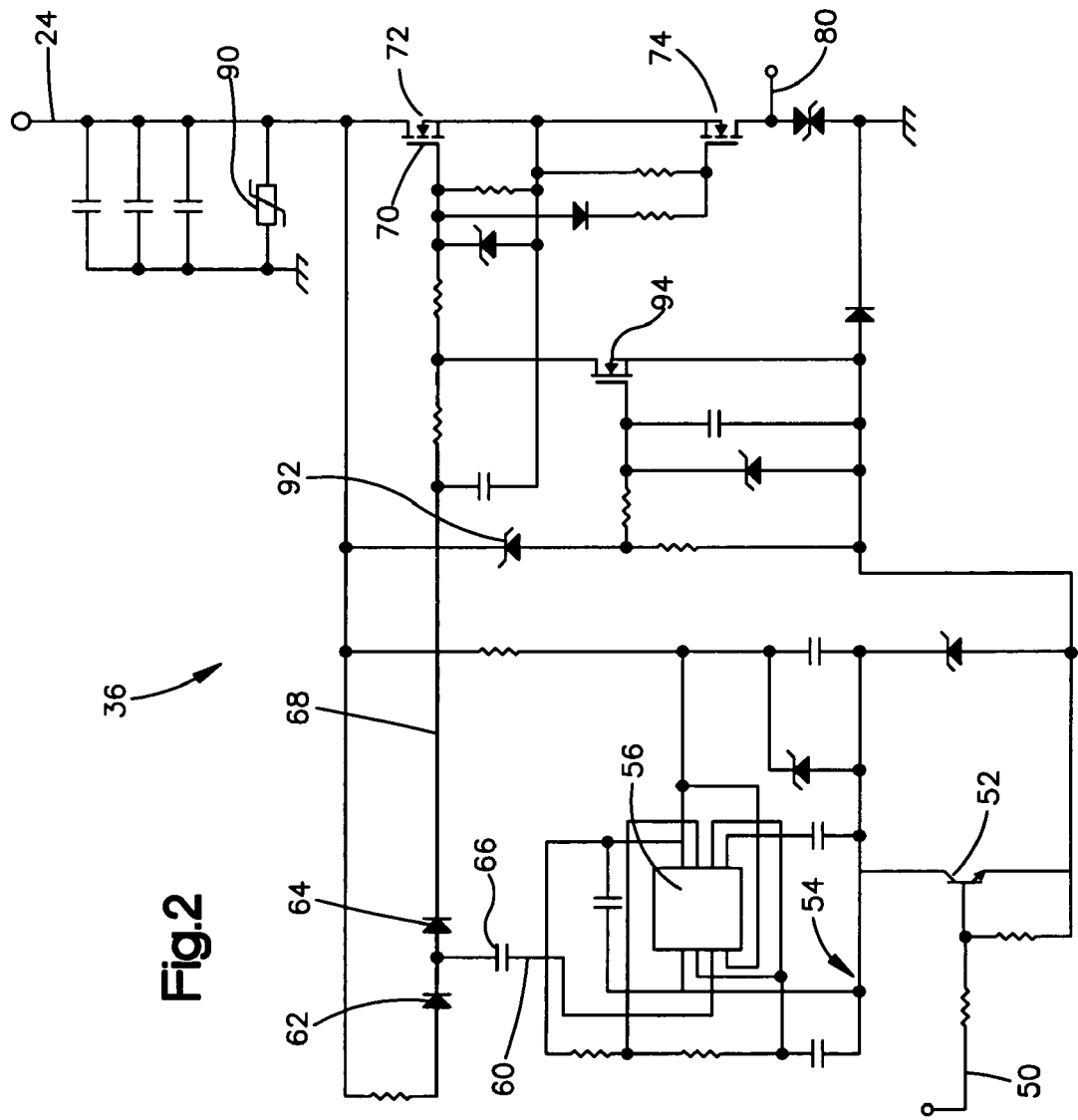
FIG. 2 illustrates an example of protection circuitry associated with a microprocessor controller in a vehicle light system.

Referring to FIG. 2, several components of the high voltage shutdown circuit 36 ensure that the driver circuits 30 are protected during a load-shedding and/or transient spike. The circuitry depicted in FIG. 2 is supported by its own circuit board within the enclosure 12 and includes a control input 50 from the microcontroller 20 that goes high if the user turns on the lamps, for example, if the primary mode is set for any illumination mode but "All Off". Receipt of a high input at the input 50 causes a switching transistor 52 to turn on, and this in turn pulls a ground pin 54 of a timer circuit 56 low. The exemplary timer is implemented with a 555 timer.

Grounding the input 54 triggers generation of a pulse train at an output 60 of the timer 56 which is coupled to a junction between two diodes 62, 64. When the pulse train is low (not floating) the battery voltage is connected to a capacitor 66 and charges the capacitor 66 up to the battery voltage (e.g., 24 volts), and when the output from the timer 56 goes high, the capacitor voltage coupled to an output 68 rises even further so that the combination of the circuit 56 and capacitor 66 acts as a doubler circuit. This circuit is coupled to a gate input 70 on a FET switch 72. A high input turns on the switch 72 and transmits the battery voltage at the input 24 to an output connection 80 through a reverse bias protection FET 74.

A transient suppression device 90 shunts high voltages to ground. Only in conjunction with other circuit components will the driver circuits 30 survive over-voltage conditions. As the voltage climbs above a first threshold (e.g., 36 VDC) a zener diode 92 will start conducting causing a FET switch 94 to turn on, while shutting off the switches 72, 74. When voltage drops below the first threshold, the zener diode 92 will stop conducting, shutting off the FET 94 and allowing the FETs 72, 74 to resume operation. When voltage is above a second threshold (e.g., 78 VDC) a metal oxide varistor clamp 90 will conduct and clamp the voltage to that level to prevent damage to the driver circuits 30.

Figure 3:
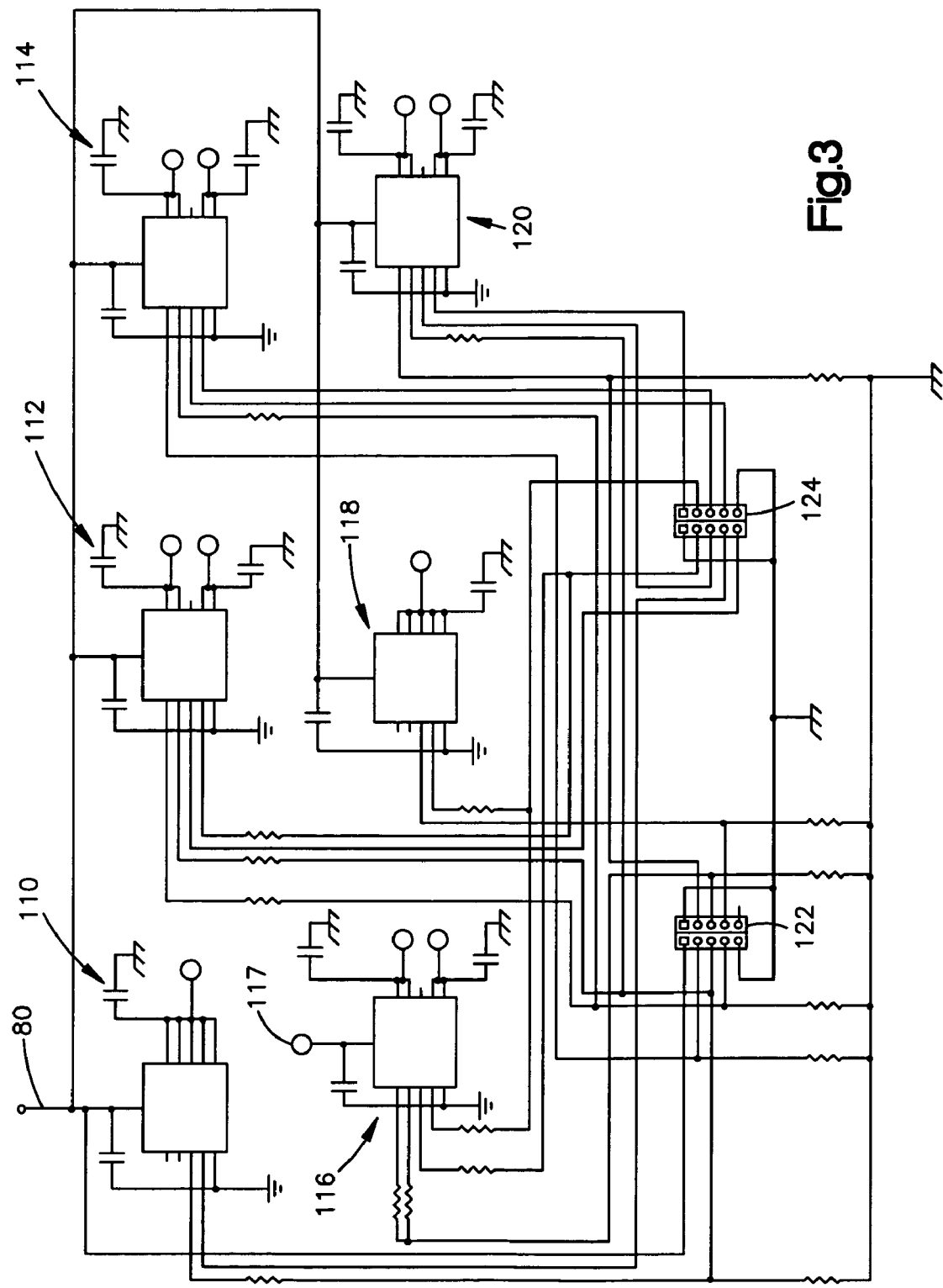
FIG. 3 illustrates an example of an output control circuit associated with a microprocessor controller in a vehicle light system.

With reference to FIG. 3, the driver circuits 30 are illustrated as including selectively activated output device drivers 110, 112, 114, 116, 118, and 120. As an example, each of the output device drivers 110, 112, 114, 116, 118, and 120 can be associated with a separate one or a separate set of the lamps 14 of the vehicle illumination system, such that each of the lamps 14 or each set of the lamps 14 can be individually controlled based on a user's selection of a primary and/or auxiliary illumination mode. For example, the driver 110 can be associated with the headlamps, such that the headlamps can be activated differently and independently of other lamps in the illumination system.

A junction box 124 is configured to couple control signals from the microcontroller 20 with the driver circuits 30 to provide individual activation and/or control of the output device drivers 110, 112, 114, 116, 118, and 120. Power is supplied to the output device drivers 110, 112, 114, 116, 118, and 120 by the battery at the input 80, demonstrated as coupled to all but the driver circuit 116. The driver circuit 116 has an input 117 that can be coupled to a battery voltage through a separate input, such as a vehicle brake pedal.

An output current associated with each of the output device drivers 110, 112, 114, 116, 118, and 120 can be monitored to determine the presence of a fault condition for the respective output device driver. In an exemplary embodiment, the output current from the output device drivers 110, 112, 114, 116, 118, and 120 is provided to a junction block 122 via a resistive voltage divider. In the example of FIG. 3, the resistive voltage divider is demonstrated as a resistor interconnecting each of the output device drivers 110, 112, 114, 116, 118, and 120 with the junction block 122, and a resistor interconnecting each respective terminal of the junction block 122 with ground. As a result, a scaled current associated with the respective output of each of the output device drivers 110, 112, 114, 116, 118, and 120 can be provided to an analog-to-digital converter (ADC) via the junction block 122. Therefore, a digital signal corresponding to the output current of each of the output device drivers 110, 112, 114, 116, 118, and 120 can be monitored to determine if the output current is above or below an operating range associated with the respective output device driver. For example, an output current of a given one of the output device drivers 110, 112, 114, 116, 118, and 120 that is greater than the operating range could indicate a fault condition. As another example, an output current of a given one of the output device drivers 110, 112, 114, 116, 118, and 120 that is less than the operating range could indicate an open circuit, such as from a burned-out lamp.

FIGS. 5-8 depict flow diagrams that demonstrate embodiments for operation of the vehicle illumination system.

Figure 5:
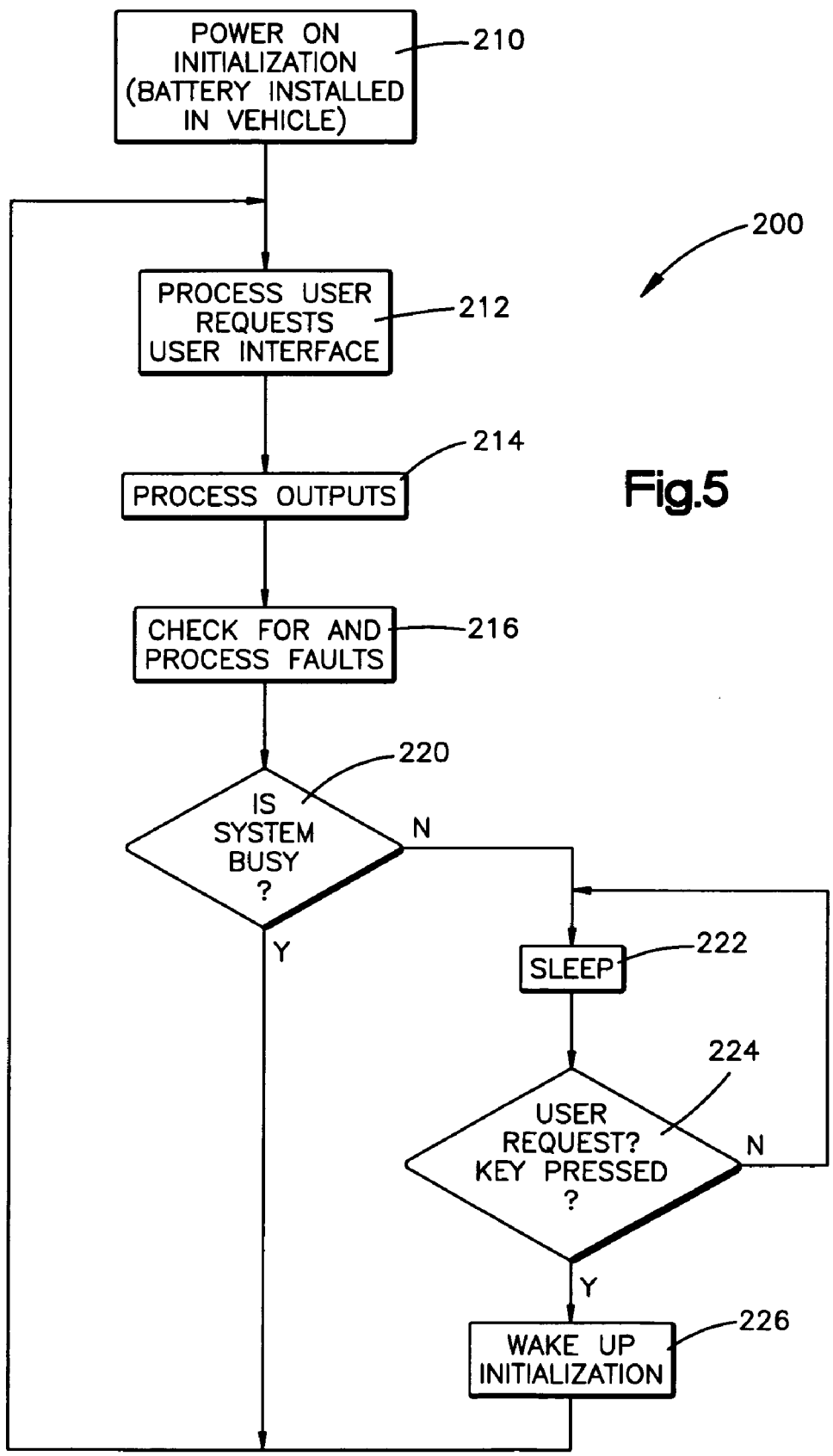
FIG. 5 illustrates a flow diagram associated with an overview of a vehicle light system.

FIG. 5 depicts an embodiment of the present invention that includes a method 200 for controlling a vehicle illumination system. The method 200 includes initializing 210 the control system by providing power from a battery to the vehicle illumination system and processing 212 at least one user request via a user interface. The method 200 may also include processing 214 at least one output from a vehicle illumination system controller in response to the at least one user request. The method 200 may also include continuously monitoring the at least one output and processing 216 at least one fault associated with the at least one output upon determining the presence of the at least one fault. The method 200 may also include conserving battery power by entering a sleep mode state 222 in response to not receiving at least one input for a predetermined amount of time. The method 200 may further include re-initializing 226 the control system upon determining 224 at least one user input key has been pressed.

Figure 6A:
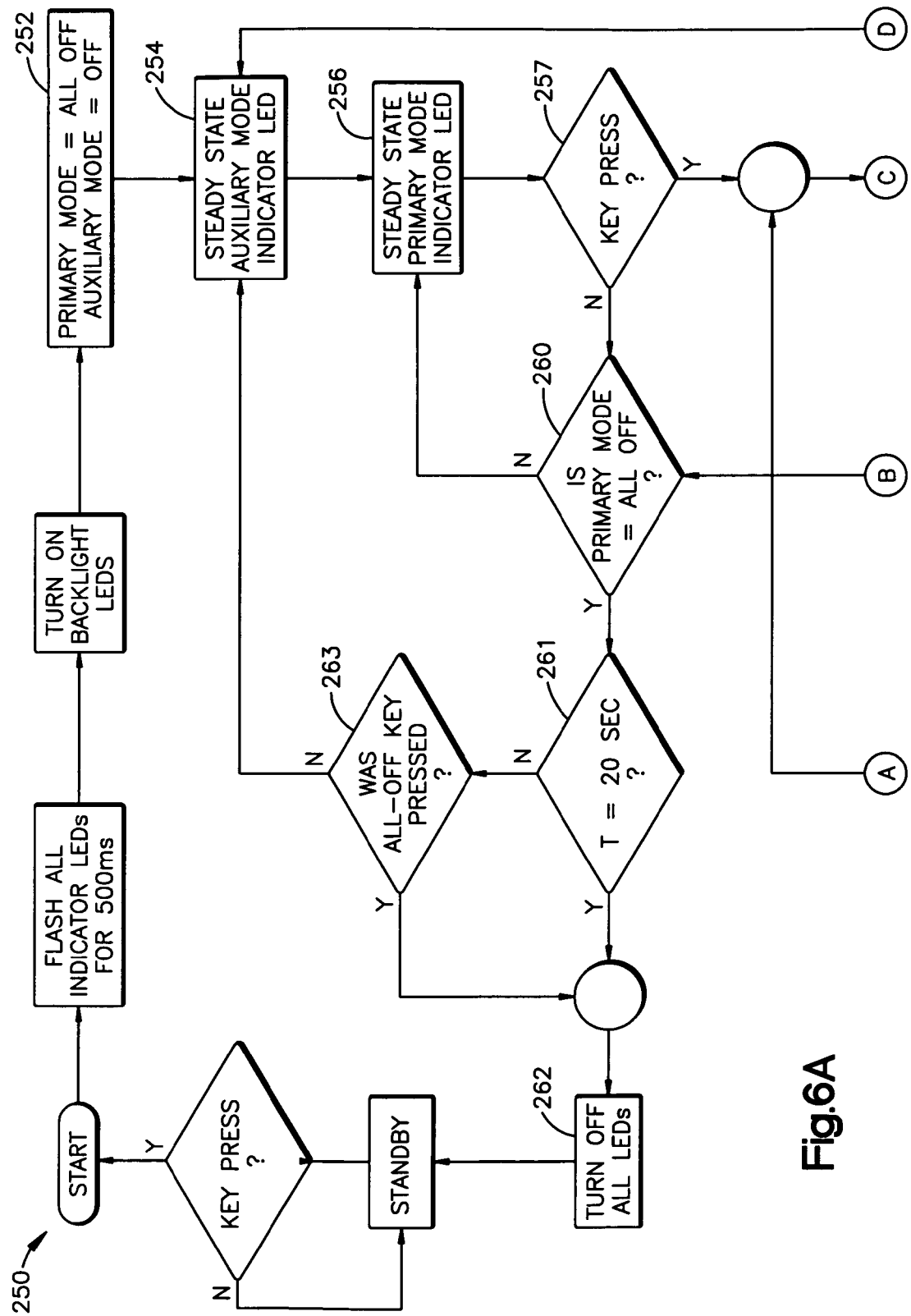
FIGS. 6A and 6B illustrate a flow diagram associated with entering user inputs in a vehicle light system.
Figure 6B:
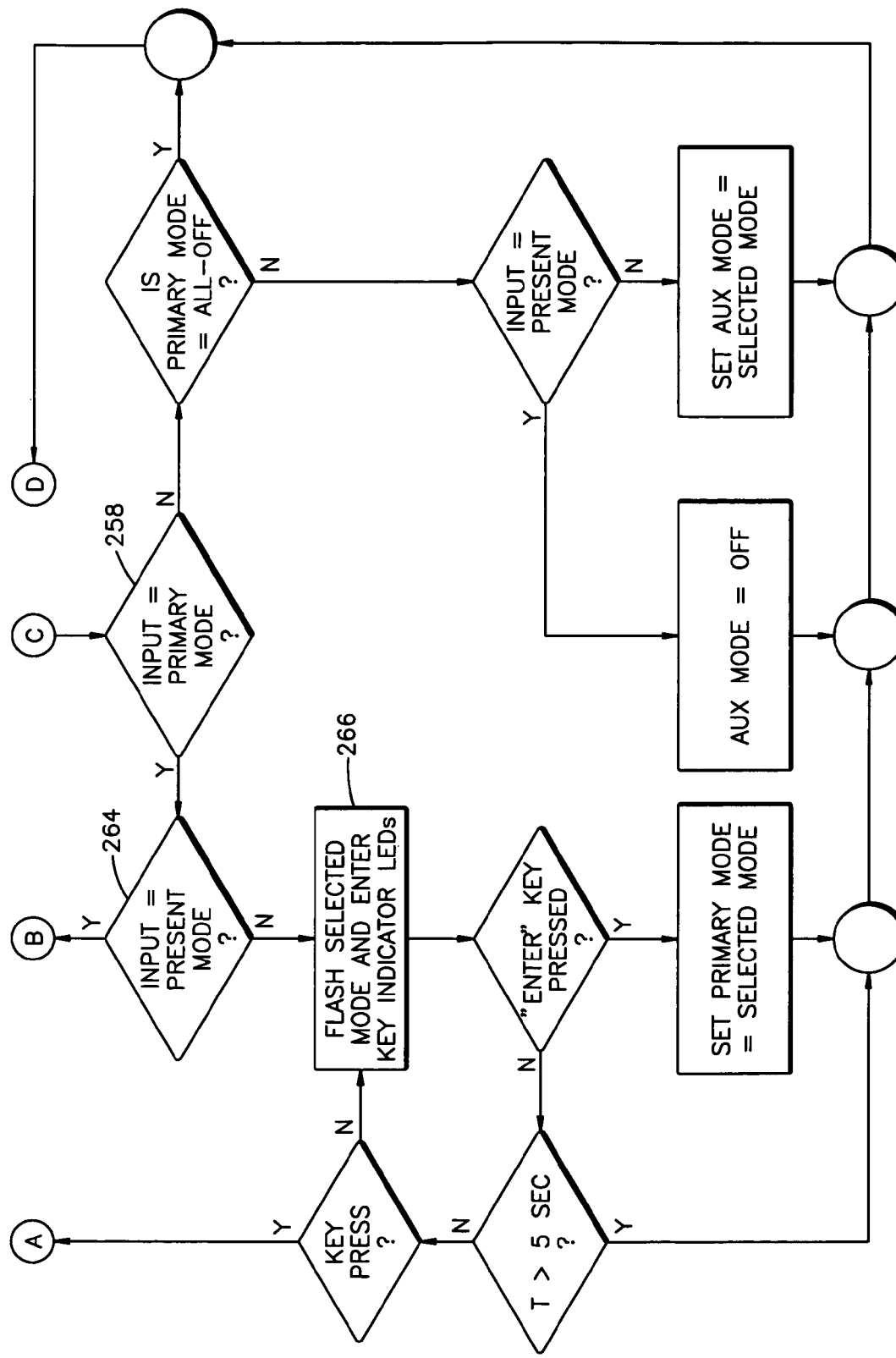

FIGS. 6A and 6B depict a flow-chart of an exemplary embodiment of the present invention that includes a method 250 for controlling inputs to a user interface, such as the user input interface 10 in the example of FIGS. 1 and 1A. In FIG. 6A, upon initializing the user input interface, such as by pressing any key on the user interface, each of the LEDs of the vehicle are configured to flash for a preset amount of time, such as 500 milliseconds. After the LEDs complete the flashing cycle, the user input interface backlight LEDs are activated, such that the text on each of the user input keys is illuminated, and thus seen more clearly by a user.

FIG. 6A demonstrates at a step 252 that a primary illumination mode is set for "All Off" and that no auxiliary illumination modes are activated. As an example, no auxiliary modes activated and the "All Off" primary mode are a default setting for the vehicle illumination system. The method 250 then proceeds to a step 254, at which the current auxiliary mode LED indicator(s) are held at a steady state, then proceeds to a step 256, at which the current primary mode LED indicator is held at a steady state. As an example, in a steady state, the control system is set for a primary illumination mode and/or an auxiliary illumination mode, and is awaiting a user input at the keypad 11. The method 250 then determines 257 if a user input key has been pressed. If a user input key has been pressed, then the method 250 proceeds to a decision 258 (depicted on FIG. 6B), via the linking symbol "C".

If a key has not been pressed, the method 250 determines 260 if the primary mode is set for "All Off". If the primary mode is not set for "All Off", the method 250 returns to the step 256. If the primary mode is set for "All Off", the method 250 determines 261 if twenty seconds have elapsed in the "All Off" mode. If twenty seconds have elapsed in the "All Off" mode, the method 250 turns off all LEDs on the user input keypad 262. If twenty seconds have not elapsed in the "All Off" mode, the method 250 determines 263 if the "All Off" key was pressed. If the "All Off" key was not pressed, the method 250 returns to the step 254. If the "All Off" key was pressed, the method 250 turns off all LEDs on the user input keypad 262. The method 250 then enters a standby mode and awaits another key press before re-initializing the user input keypad 11 again.

The above described method 250 in the example of FIG. 6A thus demonstrates deactivation of the user input keypad 11. Specifically, FIG. 6A demonstrates that the user input keypad 11 is deactivated upon pressing the "All Off" key, or through twenty seconds of inaction after initializing the user input keypad 11. FIG. 6B demonstrates changing modes through selecting a mode via the user input keypad 11.

Upon a key being pressed with the controller in the steady state, the method 250 determines 258 if the input (i.e., the pressed key) corresponds to a primary mode. If the input corresponds to a primary mode, the method 250 proceeds to the decision 264. If the input does not correspond to a primary mode, the selected input corresponds to an auxiliary mode and the method 250 proceeds to a determination of whether the primary mode is set for "All Off". If the primary mode is set for "All Off", the method 250 returns to the step 254 on FIG. 6A, via the linking symbol "D". If the primary mode is not set for "All Off", the method 250 determines if the input (i.e., the pressed key) corresponds to the present auxiliary mode. If the input corresponds to the present auxiliary mode, the present auxiliary mode is set to off (i.e., deactivated). Thus, an auxiliary mode is deactivated by re-selecting it on the keypad 11. If the input does not correspond to the present auxiliary mode, the selected auxiliary mode, provided via the input, is set as the present auxiliary mode. The method 250 then returns to the step 254 on FIG. 6A, via the linking symbol "D".

If the user input corresponds to a primary mode at the decision 264, the method 250 determines if the provided input corresponds to the present primary mode. If the provided input corresponds to the present primary mode, the method 250 returns to the decision 260 on FIG. 6A, via the linking symbol "B". If the provided input does not correspond to the present primary mode, the method 250 proceeds to the step 266, at which the selected mode key and the "Enter" key indicator LEDs begin to flash. The method 250 then determines if the "Enter" key has been pressed. If the "Enter" key has been pressed, the selected primary mode, provided via the input, is set as the present primary mode, and the method 250 returns to the step 254 on FIG. 6A, via the linking symbol "D". If the "Enter" key has not been pressed, the method 250 determines if five seconds have elapsed. If five seconds have elapsed, the method 250 returns to the step 254 on FIG. 6A, via the linking symbol "D". If five seconds have not elapsed, the method 250 determines if a key has been pressed. If a key has not been pressed, the method 250 returns to the step 266. If a key has been pressed, the method 250 returns to the decision 258 via the linking symbols "A" and "C".

The above described method 250 in the example of FIG. 6B demonstrates that auxiliary modes can be activated and deactivated without pressing the "Enter" key. The above described method 250 also demonstrates that, upon selecting a primary mode, a delay of five seconds without pressing the "Enter" key results in the user input interface returning to the previously active primary mode. However, during the five second delay, a different primary mode can be selected without having to confirm the previous selection via the "Enter" key or having to wait for the five seconds to elapse. As such, the exemplary embodiment demonstrated by the method 250 in the example of FIG. 6 provides a user-friendly mode selection interface that is forgiving of a mistakenly selected primary mode.

Figure 7A:
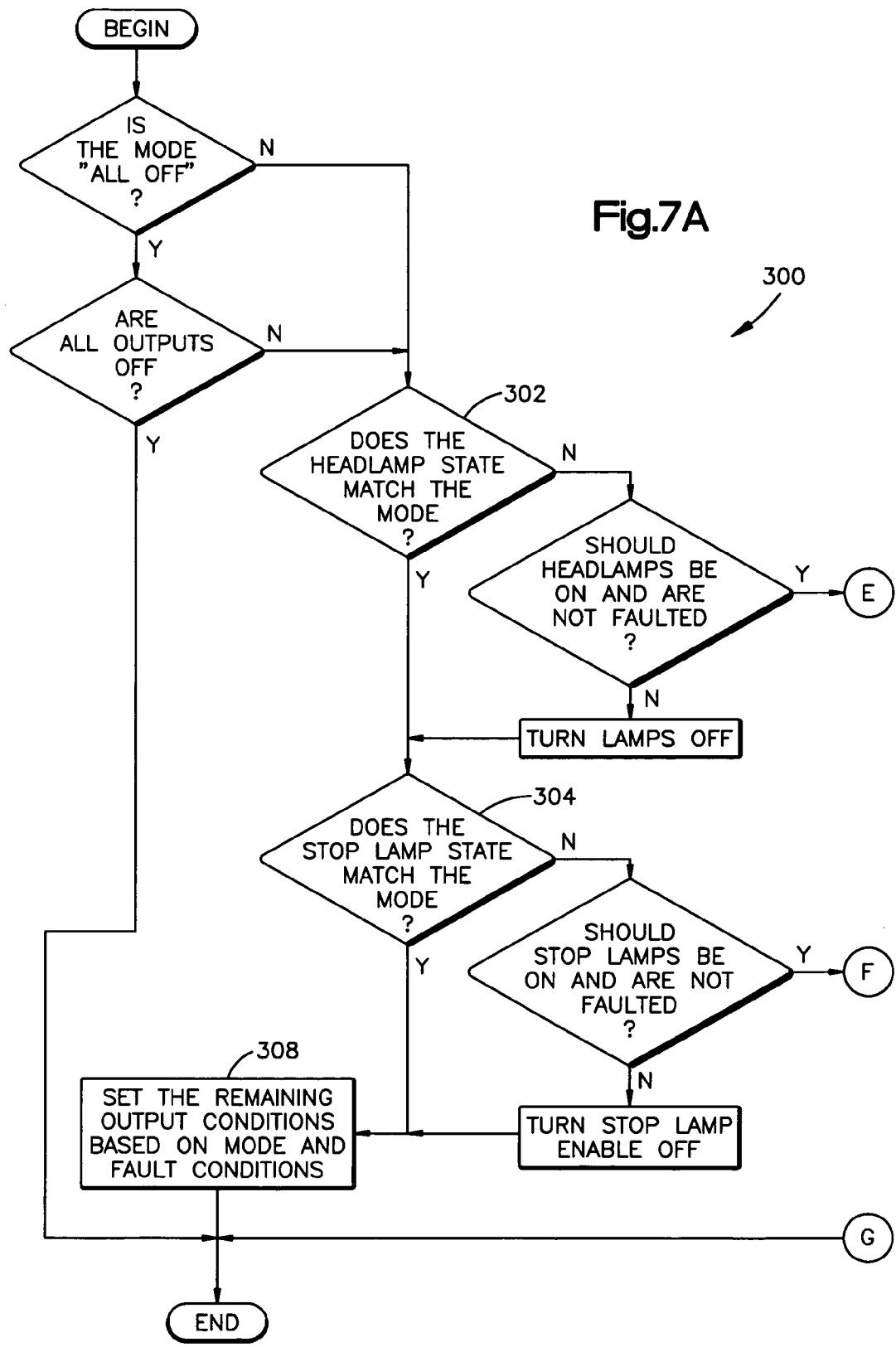
FIGS. 7A and 7B illustrate a flow diagram associated with processing outputs in a vehicle light system.
Figure 7B:
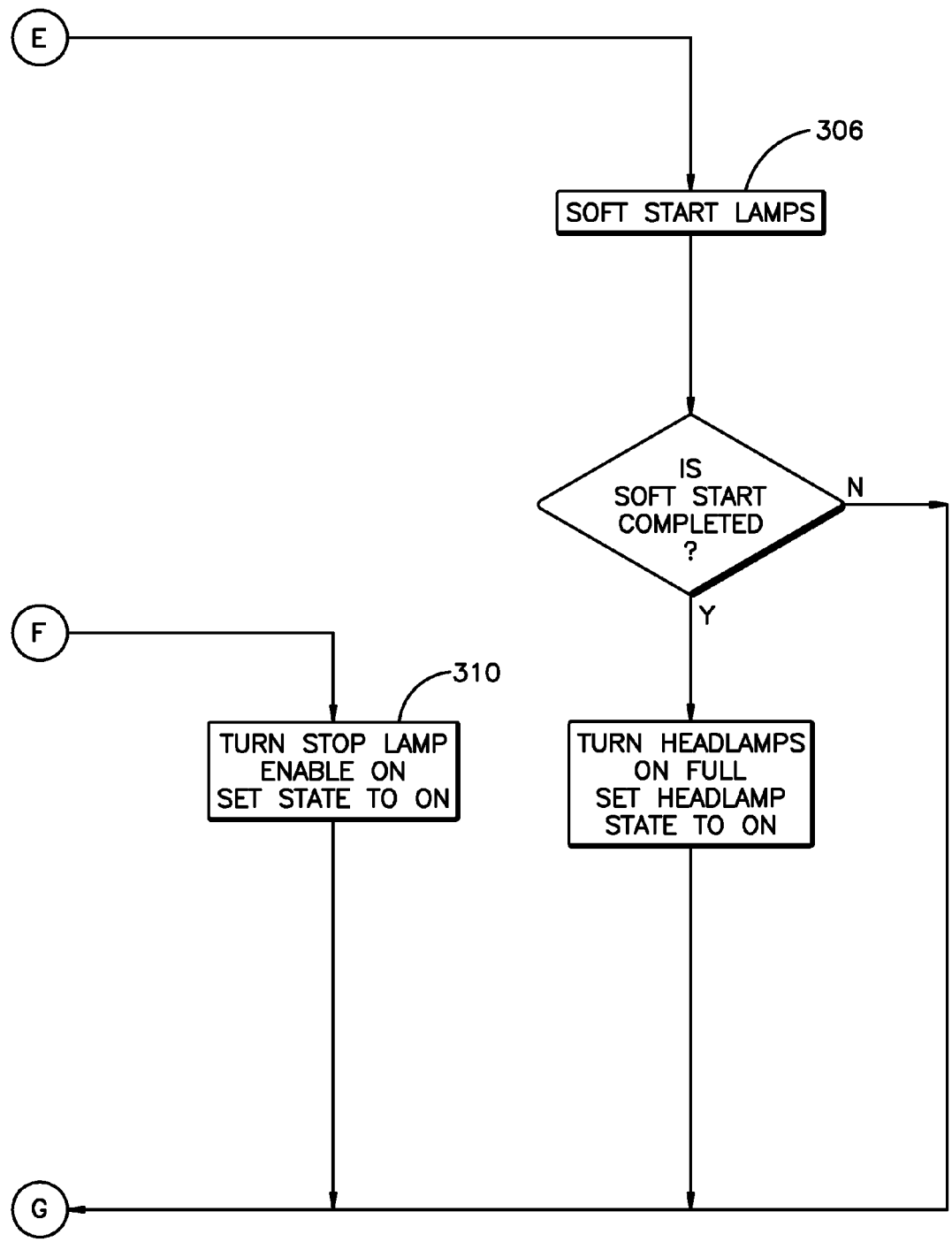

FIGS. 7A and 7B depict an exemplary embodiment of the present invention that includes a method 300 for controlling outputs, such as in response to receiving inputs at the user input interface 10 of FIGS. 1 and 1A. In FIG. 7A, the method 300 begins by determining whether the present primary mode is set for "All Off". If the present primary mode is not set for "All Off", the method 300 proceeds to a decision 302. If the present primary mode is set for "All Off", the method 300 determines if all of the outputs of the vehicle illumination system are off. If all of the outputs of the vehicle illumination system are not off, the method 300 proceeds to the decision 302. If all of the outputs of the vehicle illumination system are off, the method 300 ends based on all of the outputs being switched off as a result of the primary mode being set to "All Off".

At the decision 302, the controller determines whether the state of the headlamps (i.e., activated or deactivated) match the current primary mode. For example, one or more of the primary modes may include activation of the headlamps of the vehicle. If the state of the headlamps match the current primary mode, the method 300 proceeds to a decision 304. If the state of the headlamps do not match the current primary mode, the method 300 determines whether the headlamps should be activated and that no fault condition is sensed. If the headlamps should not be activated, or are in a fault condition, the method 300 deactivates the headlamps and proceeds to the decision 304. If the headlamps should be activated and not in a fault condition, the method 300 proceeds to the step 306 (depicted in FIG. 7B) via the linking symbol "E".

At the decision 304, the controller determines whether the state of the stop lamps (i.e., enabled or disabled) match the current primary mode. For example, one or more of the primary modes may include enablement of the stop lamps of the vehicle, such that the stop lamps are activated based on a user input (e.g., pressing a brake pedal). If the state of the stop lamps match the current primary mode, the method 300 proceeds to the step 308. If the state of the stop lamps do not match the current primary mode, the method 300 determines whether the stop lamps should be activated and not in a fault condition. If the stop lamps should be activated and not in a fault condition, the method 300 proceeds to the step 310 on FIG. 7B via the linking symbol "F". If the stop lamps should not be activated, or are in a fault condition, the method 300 disables the stop lamps and proceeds to the step 308. The method 300 sets the remaining output conditions associated with the vehicle lamps at 308 based on the current primary and/or auxiliary mode and the current fault conditions and ends. Therefore, the method 300 ends by individually activating or deactivating the remaining vehicle lamps based on the currently set primary and/or auxiliary mode, and based on which of the vehicle lamps are faulted.

FIG. 7B demonstrates activation of the headlamps and/or the stop lamps of the vehicle. The method 300 initiates a soft start of the headlamps at 306 in response to the state of the headlamps being set for activation absent a fault condition. Activation of the headlamps of a vehicle can result in the highest inrush current draw (e.g., 80 amps or more), such that instantaneous current flow of the illumination system can exceed a predetermined threshold of the headlamps and/or a summation over-current threshold of the illumination system as a whole. Particularly, the current draw of the headlamps can be the highest at lower temperatures of the headlamp filaments. Therefore, the microcontroller 20 incorporates an algorithm for soft starting the headlamp drive, such as the drive 110 in the example of FIG. 3.

In an exemplary embodiment, the microcontroller 20 commands the output drive 110 of the headlamps to provide a pulsed signal to the headlamps, such that the headlamps receive current pulses. The pulse rate of the pulsed signal begins at a high frequency to preheat the filament in the headlamp bulbs. As the filament warms, the on-state of the pulsed signal is extended while the off-state of the pulsed signal is steadily reduced in frequency, such that the current pulses to the headlamps becomes longer in duration. Therefore, the current draw of the headlamps is steadily reduced until the current is low enough to fully activate the output drive 110 (i.e., the frequency of the off-state is reduced to zero). Accordingly, because the temperature of the headlamp filaments is gradually increased by the current pulses prior to full activation of the headlamps, the inrush current of the headlamps is greatly reduced.

Upon initiating the soft start of the headlamps at the step 306, the method 300 determines if the soft start of the headlamps is complete. For example, the method 300 determines if the inrush current associated with headlamps is at an acceptable level, or determines that a temperature associated with the headlamp filaments is at a level that can result in an acceptable level of inrush current. If the soft start of the headlamps is complete, the method 300 fully activates the headlamps, such as by setting the frequency of the off-state of the pulsed signal equal to zero, and sets the state of the headlamps to "on". Upon full activation of the headlamps, or upon the soft start of the headlamps being incomplete, the method 300 ends by returning to FIG. 7A via the linking symbol "G".

In response to the state of the stop lamps being set for enablement absent a fault condition, the method 300 enables the stop lamps and sets the state of the stop lamps to "on" at the step 310. It is to be understood that the stop lamps may require an additional input from a user, such as via a brake pedal, to activate the stop lamps once the stop lamps are enabled by the microcontroller 20. However, the state of the stop lamps corresponds to an enablement setting associated with the current primary and/or auxiliary illumination mode, and are thus set to "on" regardless of actual activation of the stop lamps. The method 300 then ends by returning to FIG. 7A via the linking symbol "G".

The above described method 300 describes a manner in which headlamps and stop lamps are activated and/or enabled separately from other lamps in the vehicle illumination system. Specifically, FIGS. 7A and 7B describe soft starting of the headlamps and enablement of the stop lamps, as opposed to direct activation.

Figure 8A:
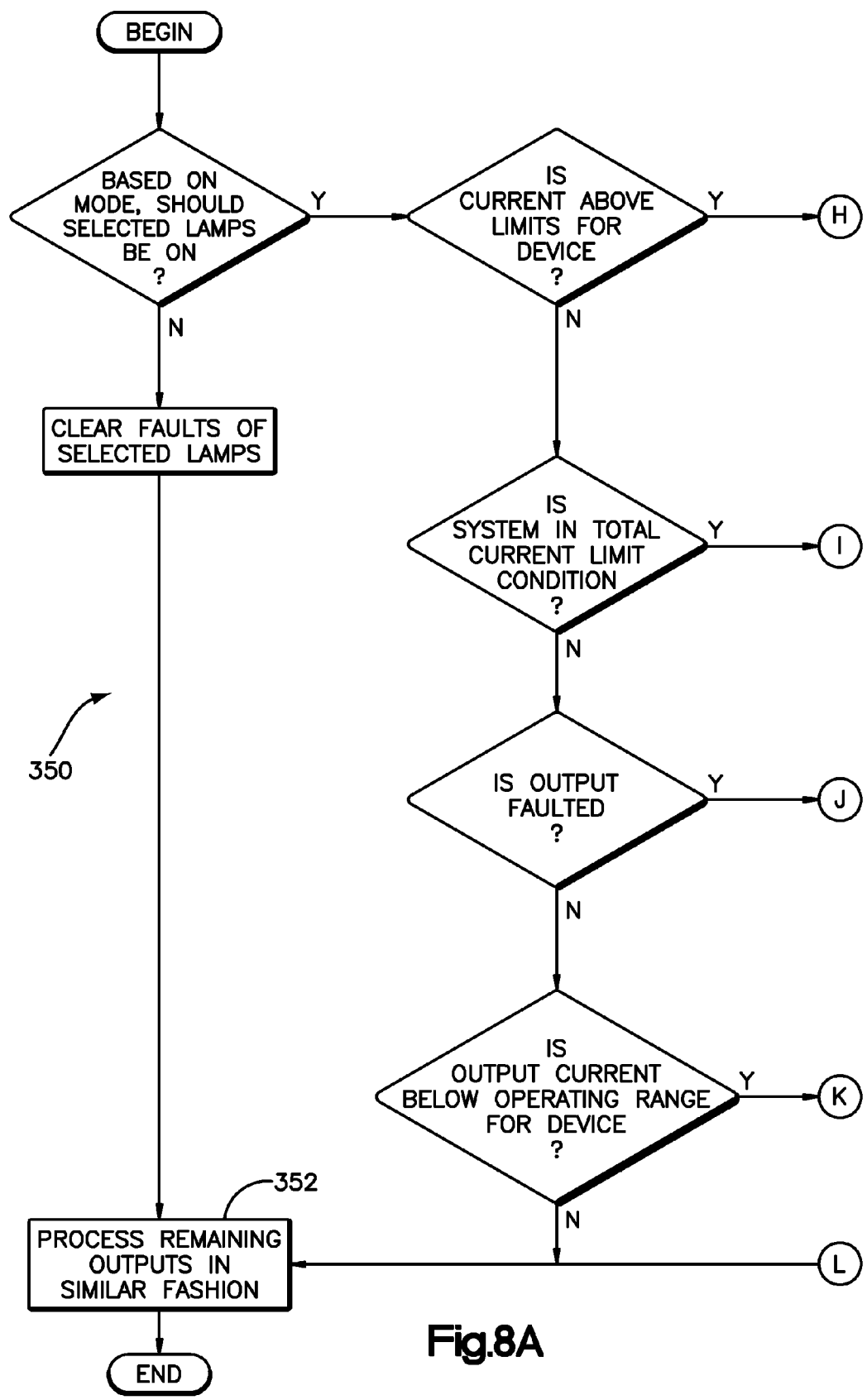
FIGS. 8A and 8B illustrate a flow diagram associated with a fault detection and processing system in a vehicle light system
Figure 8B:
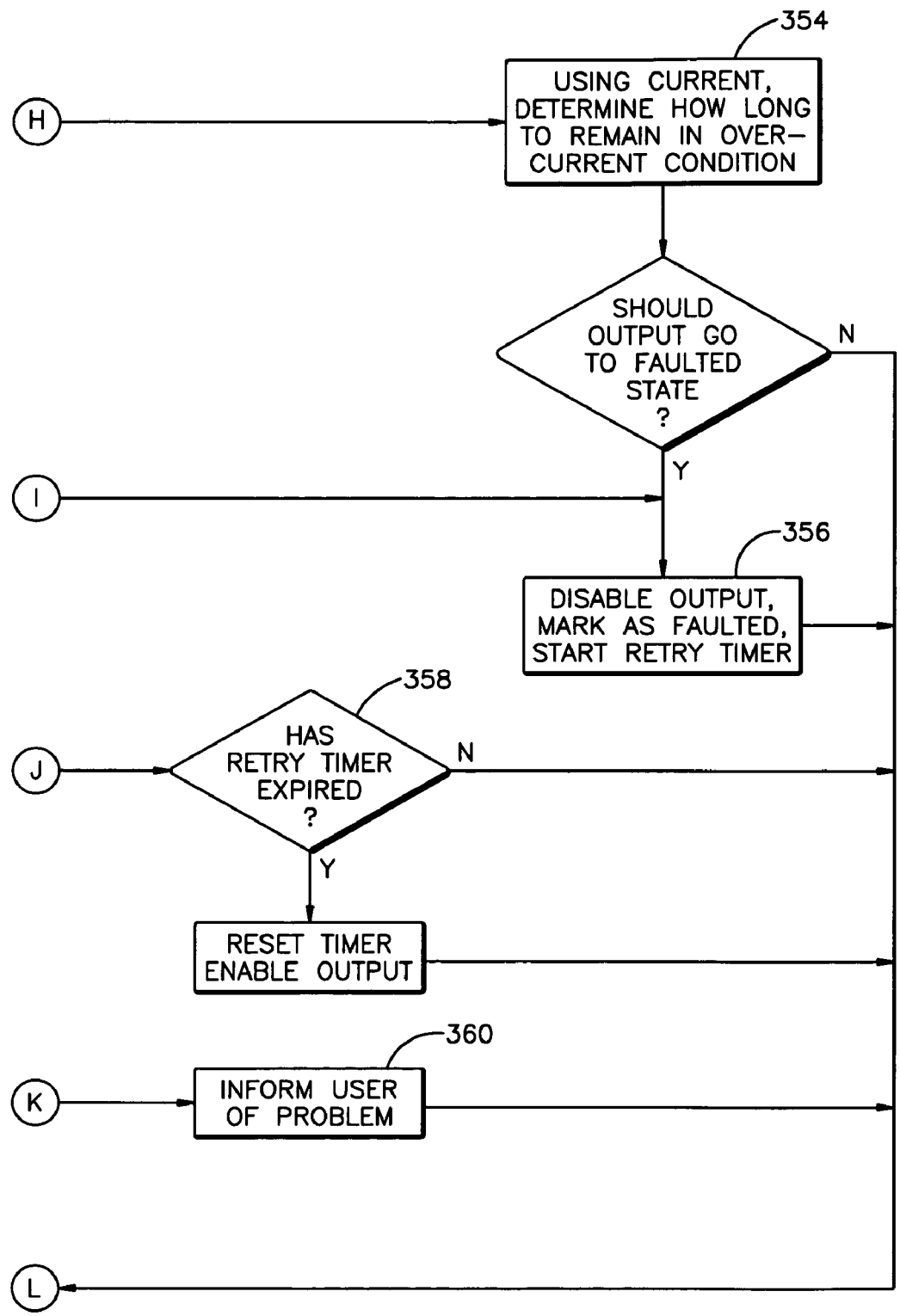

FIGS. 8A and 8B depict an exemplary embodiment of the present invention that includes a method 350 for processing faults, such as in response to one of an over-current condition associated with an individual output device driver or a summation over-current condition associated with the vehicle illumination system. The method 350 can be applicable to a given one of the output device drivers 110, 112, 114, 116, 118, and 120. As an example, the vehicle illumination system may implement the method 350 for each of the output device drivers 110, 112, 114, 116, 118, and 120 sequentially, or in separately running processes concurrently. Therefore, in the example of FIGS. 8A and 8B, it is to be understood that the "selected lamp(s)" refers to the lamp(s) corresponding to a given one of the output device drivers 110, 112, 114, 116, 118, and 120.

In FIG. 8A, the method 350 begins by determining whether the selected lamps are activated based on the selected illumination mode (e.g., primary and/or auxiliary). If the selected lamps are not activated based on the selected illumination mode, the method 350 clears faults associated with the selected lamps and proceeds to the step 352, at which the method 350 processes the remaining outputs associated with one or more of the output device drivers 110, 112, 114, 116, 118, and 120 before ending. If the selected lamps are activated based on the selected illumination mode, the method 350 determines if the current is above a limit for the device. For example, the device can correspond to one or more of the illumination lamps, or can correspond to the selected one of the output device drivers 110, 112, 114, 116, 118, and 120. If the current is above a limit for the device, the method 350 proceeds to the step 354 (depicted on FIG. 8B) via the linking symbol "H".

If the current is not above a limit for the device, the method 350 determines if a summation over-current condition exists for the vehicle illumination system. For example, the method 350 determines if the total aggregate output current associated with all vehicle lamps exceeds a summation over-current threshold. In an exemplary embodiment, the summation over-current threshold is less than a sum of the over-current thresholds associated with each of the individual vehicle lamps. If a summation over-current condition exists for the vehicle illumination system, the method 350 proceeds to the step 356 on FIG. 8B via the linking symbol "I". If a summation over-current condition does not exist for the vehicle illumination system, the method 350 determines if the output associated with the specific output device driver is faulted. For example, one of the output device drivers 110, 112, 114, 116, 118, and 120 can become faulted based on an over-current condition, as demonstrated below in the example of FIG. 8B. If the output associated with the specific output device driver is faulted, the method 350 proceeds to the decision 358 on FIG. 8B via the linking symbol "J". If the output associated with the specific output device driver is not faulted, the method 350 determines if the output is below the current limit for the device, such as based on a normal operating condition for the device. If the output is below the current limit for the device, the method 350 proceeds to the step 358 on FIG. 8B via the linking symbol "K". If the output is not below the current limit for the device, the method 350 proceeds to the step 352, such that the method 350 begins again with the next one or more of the output device drivers 110, 112, 114, 116, 118, and 120.

The method 350 described above regarding the example of FIG. 8A demonstrates a continuous over-current diagnostic check, both for an over-current associated with an individual output device driver and for a summation over-current. The example of FIG. 8B demonstrates how fault conditions are set and cleared.

Upon the current being above a limit for the device, the method 350 determines at 354 how long the device should remain in an over-current condition based on a magnitude of the current. As an example, the amount of time the device should remain in the over-current condition is inversely proportional to the magnitude of the current, such that greater amounts of current results in less time in the over-current condition. The method 350 then determines if the output device driver should go to a faulted state based on the amount of time determined in the step 354. For example, the method 350 could set a timer threshold based on the amount of time determined in the step 354, such that the method 350 determines if the output device driver should go to the faulted state based on whether an elapsed time in the over-current condition exceeds the timer threshold. If the output device driver should not go to the faulted state, for example, as a result of the current dropping below the over-current limit for the device before expiration of the timer, the method 350 proceeds to the step 352 via the linking symbol "L".

If the output device driver should go to the faulted state, the method 350 proceeds to the step 356, at which the output device driver is disabled, marked as faulted, and a retry timer associated with the output device driver is started. The method 350 then proceeds to the step 352 via the linking symbol "L".

With regard to marking the fault condition, in an exemplary embodiment, the microcontroller 20 includes an algorithm that provides diagnostics for informing the user that an output fault exists by flashing an appropriate indicator (e.g., fault LED for a specific output). In addition, the algorithm in the exemplary embodiment uses voltage and current feedback to determine the nature of the fault, such that the microcontroller 20 determines if the specific output device driver has an output fault that is an open circuit fault (e.g., from a burned-out lamp) or short circuit fault. This element of diagnostics provides real time feedback to the operator when a problem occurs, such that the microcontroller 20 determines if a specific lamp is open or shorted based on monitoring the voltage and current parameters on each output. A fault indicator LED for the output is illuminated and flashed when an appropriate fault condition is present. As an example, the type of fault is identified by the rate of flashing, such as a short circuit condition represented by a fast pulse and an open circuit condition represented by a slow pulse.

In an exemplary embodiment of the present invention, the retry timer at the step 356 is implemented as a timer that is configured for clearing a fault condition. As an example, the retry timer is a directly proportional timer. The retry timer is thus a timer for recovering from a fault condition that has a variable timing threshold based on the amount of the over-current. In the exemplary embodiment, the retry timer is specific to a given one of the faulted outputs, thus allowing each of the faulted outputs to recover individually. Because the fault is recovered from individually, and because the over-current amount sets the amount of time delay based on the severity of the fault (i.e., greater time delay for greater amounts of over-current), the vehicle illumination system can recover from faults at a safe rate, as opposed to repeated retry attempts for all faulted outputs in short periods of time. Therefore, excess heat damage to the vulnerable circuit components, such as the output device driver, and/or wire harness assemblies is mitigated.

Upon a determination of a faulted output, the method 350 determines 358 whether the retry timer has expired. If the retry timer has expired, the timer is reset and the output is enabled, thus clearing the fault condition. Upon clearing the fault, or if the retry timer has not expired, the method 350 proceeds to the step 352 via the linking symbol "L". Upon an output current being below an operating range for the device, the method 350 informs the user of the problem at the step 360, such as by posting a message or illuminating an indicator LED. As an example, the problem could include an open circuit condition, such as a burned-out lamp corresponding to the given output device driver. The method 350 then proceeds to the step 352 via the linking symbol "L".

The method 350 described above regarding the example of FIG. 8B thus demonstrates an embodiment of the present invention of how faults are set and cleared. In addition, in another exemplary embodiment of the present invention, the vehicle illumination system can implement sequential and activation and/or deactivation of vehicle lamps to provide over-current protection. The sequential activation and/or deactivation can be implemented separate from or in conjunction with the method 350.

In an exemplary embodiment, the microcontroller 20 staggers activation of vehicle lamps to reduce inrush current, thus preventing a summation over-current condition. For example, in response to a user selecting a primary and/or auxiliary illumination mode via the user input interface 10, a number of vehicle lamps 14 may be commanded by the microcontroller 20 to be activated. Each of the vehicle lamps 14 may draw an inrush current, such that, when activated concurrently, the aggregate amount of the inrush current can exceed the summation over-current threshold for the vehicle illumination system. To prevent the excessive inrush current of all of the vehicle lamps at once, the microcontroller 20 staggers the output turn-on sequence, such that each of the vehicle lamps is activated individually in a rapid sequence. As a result, the sequential activation of the vehicle lamps provides a gradual current draw to avoid a bulk inrush of current which can stress other electrical components on the vehicle (i.e., the alternator), and cause a nuisance summation over-current condition.

In another exemplary embodiment, the microcontroller 20 sequentially deactivates vehicle lamps based on a priority structure in a load-shedding procedure, such that over-current conditions can be avoided and/or cleared. Sequentially, upon a summation over-current condition, the microcontroller 20 begins load-shedding, such that one or more of the output drives are deactivated to reduce the aggregate output current associated with the vehicle lamps. In an example, the microcontroller 20 incorporates an algorithm for setting the priority of output drives from highest to lowest based on considerations of safety. As a result, the most important output drives remain active in the event of a summation over-current condition. For example, the set priority dictates that the least needed output drives are deactivated, leaving the most important drives (e.g., headlamps) active.

The load-shedding priority can be set in a variety of ways. For example, in one exemplary embodiment, the priority of load-shedding is determined automatically by the microcontroller 20. In this example, if a given output drive exceeds an individual over-current limit and a summation over-current condition is present, that individual output drive is deemed to have the highest priority, and is thus the first to be disabled. In another exemplary embodiment, the load-shedding priority is predefined by the user or is programmed into the microcontroller 20. As such, upon the occurrence of a summation over-current condition, the lowest priority output is deactivated first and the summation current re-checked. If the over-current condition remains, such that the aggregate vehicle lamp output current is still too high, the next lowest priority is deactivated. This low-to-high prioritization is repeated until the summation over-current condition is removed, such that the aggregate vehicle lamp output current is at a valid operational level. As yet another exemplary embodiment, the microcontroller 20 implements a load-shedding priority that is a combination of the prior two examples. As such, priority is set based on individual over-current levels, with predefined exceptions (e.g., headlamps) being allowed to continue being activated, even if experiencing an individual over-current condition. Regardless of the priority scheme implemented, the load-shedding priority embodiment allows systematic disabling of output drives until the summation over-current condition clears for safer operation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit or scope of the appended claims.

What is claimed is:

1. A vehicle illumination system comprising:
   an input keypad configured to receive at least one input provided by a user;
   a controller configured to receive input commands provided by the input keypad and to sequentially control a state of a plurality of output device drivers corresponding to a respective plurality of vehicle lamps; and
   overvoltage protection circuitry configured to monitor an electrical signal associated with each of the plurality of output device drivers relative to respective over-current condition thresholds and a summation over-current condition threshold, the summation over-current threshold being less than a sum of the respective over-current condition thresholds associated with each of the plurality of outputs.

2. The vehicle illumination system of claim 1, wherein the controller is configured to sequentially activate each of the plurality of vehicle lamps in response to a respective input command.

3. The vehicle illumination system of claim 1, wherein the overvoltage protection circuitry is further configured to detect a short circuit condition associated with a given one of the plurality of output device drivers based on at least one of a magnitude of current and a magnitude of voltage associated with the given one of the plurality of output device drivers, and further configured to detect an open circuit condition based on at least one of the magnitude of current and the magnitude of voltage associated with the given one of the plurality of output device drivers.

4. The vehicle illumination system of claim 1, further comprising at least one fault indicator configured to signal to the user at least one of an output device over-current condition upon the electrical signal associated with a respective one of the plurality of output device drivers exceeding the respective over-current condition threshold and a summation over-current condition upon a summation current flow associated with the plurality of output device drivers exceeding the summation over-current condition threshold.

5. The vehicle illumination system of claim 4, wherein each of the plurality of output device drivers is assigned a priority, such that the controller sequentially deactivates the plurality of output device drivers in an order associated with the priority until the summation current flow decreases below the summation over-current condition threshold.

6. The vehicle illumination system of claim 5, wherein the priority is based on at least one of assignment by the user and a relative magnitude of the electrical signals associated with each of the plurality of output device drivers.

7. The vehicle illumination system of claim 1, wherein at least one of the plurality of output device drivers provides a pulsed current output to the respective one of the plurality of vehicle lamps, the pulsed current output gradually decreasing an off-state frequency over a predetermined period of time to eventually provide a substantially DC current to the respective one of the plurality of vehicle lamps.

8. The vehicle illumination system of claim 1, wherein the overvoltage protection circuitry comprises a fault timer, and wherein the controller is further configured to deactivate a given one of the plurality of outputs upon the respective electrical signal exceeding the respective over-current condition threshold, and further configured to reactivate the given one of the plurality of outputs upon expiration of a set time associated with the fault timer, the set time being based on a magnitude of the electrical signal associated with the given one of the plurality of outputs.

9. The vehicle illumination system of claim 1, wherein the at least one input provided by the user is a first input associated with selecting an illumination mode associated with the plurality of vehicle lamps, and wherein the input keypad is further configured to prompt the user to verify the illumination mode selection and to permit selecting a different illumination mode prior to verifying the illumination mode selection.

10. A method for controlling a vehicle illumination system, the method comprising:
    monitoring an input keypad for at least one input provided by a user;
    providing an input command to a controller in response to the at least one input provided by the user;
    continuously monitoring an electrical signal associated with each of a plurality of outputs associated with the controller relative to respective over-current condition thresholds;
    sequentially controlling a state of the plurality of outputs with respect to each of a plurality of vehicle lamps;
    said monitoring including continuously monitoring a summation current flow associated with the plurality of outputs relative to a summation over-current condition threshold; and
    signaling a summation over-current condition upon the summation current flow exceeding the summation over-current condition threshold.

11. The method of claim 10, wherein sequentially controlling the state of the plurality of outputs comprises sequentially activating each of the plurality of vehicle lamps.

12. The apparatus method of claim 1, further wherein the overvoltage protection circuitry:
    continuously monitors a summation current flow associated with the plurality of outputs relative to a summation over-current condition threshold; and
    signals a summation over-current condition upon the summation current flow exceeding the summation over-current condition threshold.

13. The method of claim 10, further comprising assigning a priority associated with each of the plurality of vehicle lamps, wherein sequentially controlling the state of the plurality of outputs comprises, upon signaling the summation over-current condition, sequentially deactivating the plurality of vehicle lamps until the summation current flow decreases below the summation over-current condition threshold.

14. The method of claim 13, wherein the priority associated with each of the plurality of vehicle lamps is based at least on the electrical signal associated with a given one of the plurality of outputs exceeding the respective over-current condition threshold.

15. The method of claim 14, further comprising setting the summation over-current condition threshold to a magnitude that is less than a sum of the respective over-current condition thresholds associated with each of the plurality of outputs.

16. The method of claim 10, wherein sequentially controlling the state of the plurality of outputs comprises providing a pulsed current output to a vehicle headlamp, the pulsed current output gradually decreasing an off-state frequency over a predetermined period of time to eventually provide a substantially DC current to the vehicle headlamp.

17. The method of claim 10, further comprising:
deactivating a given one of the plurality of outputs upon the electrical signal associated with the given one of the plurality of outputs exceeding the respective over-current condition threshold; and
reactivating the given one of the plurality of outputs upon expiration of a set time associated with a fault timer, the set time being based on a magnitude of the electrical signal associated with the given one of the plurality of outputs.

18. The method of claim 10, further comprising:
continuously monitoring a magnitude of voltage associated with each of the plurality of outputs;
signaling a short circuit fault associated with a given one of the plurality of outputs upon detecting a short circuit condition based on at least one of a magnitude of current and the magnitude of voltage associated with each of the plurality of outputs; and
signaling an open circuit fault associated with a given one of the plurality of outputs upon detecting an open circuit condition based on at least one of the magnitude of current and the magnitude of voltage associated with each of the plurality of outputs.

19. The method of claim 10, wherein the at least one input provided by the user is a first input associated with changing a present illumination mode associated with the plurality of vehicle lamps from a first illumination mode to a second illumination mode, the method further comprising:
monitoring the input keypad for a verification command provided by the user associated with verifying the change from the first illumination mode to the second illumination mode;
selecting a third illumination mode as the present illumination mode based on a second input by the user prior to receiving the verification command associated with verifying the change from the first illumination mode to the second illumination mode; and
setting the third illumination mode as the present illumination mode upon receiving a verification command provided by the user associated with verifying the change from the first illumination mode to the third illumination mode.

20. A method for controlling a vehicle illumination system, the method comprising:
providing battery power to a control circuit associated with the vehicle illumination system;
processing at least one user request via a user interface;
processing at least one vehicle lamp output in a vehicle illumination system controller in response to the at least one input provided by the user by providing a pulsed current output to a vehicle headlamp, the pulsed current output gradually decreasing an off state frequency over a predetermined period of time to eventually provide a substantially DC current to the vehicle headlamp;
monitoring faults associated with the at least one vehicle lamp output;
switching the control circuit to a sleep mode state in response to not receiving the at least one input for a predetermined amount of time; and
waking the control circuit upon receiving the at least one input in the sleep mode state.

21. The method of claim 20, wherein monitoring faults associated with the at least one vehicle lamp output comprises continuously monitoring an electrical signal associated with each of the at least one vehicle lamp output associated with the vehicle illumination system controller relative to a respective at least one over-current condition threshold.

22. The method of claim 21, further comprising:
continuously monitoring a summation current flow associated with the at least one vehicle lamp output relative to a summation over-current condition threshold; and
signaling a summation over-current condition upon the summation current flow exceeding the summation over-current condition threshold.

23. The method of claim 22, further comprising sequentially deactivating the at least one vehicle lamp until the summation current flow decreases below the summation over-current condition threshold in response to signaling the summation over-current condition.

24. The method of claim 21, further comprising:
assigning a priority associated with each of the at least one vehicle lamp based at least on the electrical signal associated with a given one of the at least one vehicle lamp output exceeding the respective over-current condition threshold.

25. The method of claim 24, further comprising setting the summation over-current condition threshold to a magnitude that is less than a sum of the respective at least one over-current condition threshold associated with each of the at least one vehicle lamp output.

26. The method of claim 20, wherein processing the at least one vehicle lamp output comprises sequentially controlling a state of a plurality of outputs with respect to each of a plurality of vehicle lamps.

27. The method of claim 26, wherein sequentially controlling the state of the plurality of outputs comprises sequentially activating each of the plurality of vehicle lamps.

28. A method for controlling a vehicle illumination system, the method comprising:
providing battery power to a control circuit associated with the vehicle illumination system;
processing at least one user request via a user interface;
processing at least one vehicle lamp output in a vehicle illumination system controller in response to the at least one input provided by the user, the at least one output being associated with a respective at least one vehicle lamp;
monitoring faults associated with the at least one vehicle lamp output and deactivating the at least one vehicle lamp output upon the electrical signal associated with the at least one vehicle lamp output exceeding a respective over-current condition threshold; and
reactivating the at least one vehicle lamp output upon expiration of a set time associated with a fault timer, the set time being based on a magnitude of the electrical signal associated with the at least one vehicle lamp output;

switching the control circuit to a sleep mode state in response to not receiving the at least one input for a predetermined amount of time; and waking the control circuit upon receiving the at least one input in the sleep mode state.

29. A method for controlling a vehicle illumination system, the method comprising:

providing battery power to a control circuit associated with the vehicle illumination system;

processing at least one user request via a user interface;

processing at least one vehicle lamp output in a vehicle illumination system controller in response to the at least one input provided by the user, the at least one output being associated with a respective at least one vehicle lamp;

monitoring faults associated with the at least one vehicle lamp output by continuously monitoring a magnitude of voltage associated with the at least one vehicle lamp output;

signaling a short circuit fault associated with the at least one vehicle lamp output upon detecting a short circuit condition based on at least one of a magnitude of current and the magnitude of voltage associated with the at least one vehicle lamp output; and signaling an open circuit fault associated with the at least one vehicle lamp output upon detecting an open circuit condition based on at least one of the magnitude of current and the magnitude of voltage associated with the at least one vehicle lamp output;

switching the control circuit to a sleep mode state in response to not receiving the at least one input for a predetermined amount of time; and waking the control circuit upon receiving the at least one input in the sleep mode state.

30. A method for controlling a vehicle illumination system, the method comprising:

providing battery power to a control circuit associated with the vehicle illumination system;

processing at least one user request via a user interface;

processing at least one vehicle lamp output in a vehicle illumination system controller in response to the at least one input provided by the user, the at least one output being associated with a respective at least one vehicle lamp;

monitoring faults associated with the at least one vehicle lamp output;

switching the control circuit to a sleep mode state in response to not receiving the at least one input for a predetermined amount of time; and waking the control circuit upon receiving the at least one input in the sleep mode state;

wherein the at least one user request is a first user request associated with changing a present illumination mode associated with the plurality of vehicle lamps from a first illumination mode to a second illumination mode, the method further comprising:

monitoring the user interface for a verification command provided by the user associated with verifying the change from the first illumination mode to the second illumination mode;

selecting a third illumination mode as the present illumination mode based on a second input by the user prior to receiving the verification command associated with verifying the change from the first illumination mode to the second illumination mode; and setting the third illumination mode as the present illumination mode upon receiving a verification command provided by the user associated with verifying the change from the first illumination mode to the third illumination mode.

31. A method for controlling a vehicle illumination system, the method comprising:

providing battery power to a control circuit associated with the vehicle illumination system;

processing at least one user request via a user interface;

processing a plurality of vehicle lamp outputs in a vehicle illumination system controller in response to the at least one input provided by the user, continuously monitoring a summation current flow associated with the plurality of vehicle lamp outputs relative to a summation over-current condition threshold; and signaling a summation over-current condition upon the summation current flow exceeding the summation over-current condition threshold.

32. The method of claim 31, further comprising sequentially deactivating the at least one vehicle lamp until the summation current flow decreases below the summation over-current condition threshold in response to signaling the summation over-current condition.

33. The method of claim 31, further comprising:

assigning a priority associated with each of the at least one vehicle lamp based at least on the electrical signal associated with a given one of the at least one vehicle lamp output exceeding the respective over-current condition threshold.

34. The method of claim 33, further comprising setting the summation over-current condition threshold to a magnitude that is less than a sum of the respective at least one over-current condition threshold associated with each of the at least one vehicle lamp output.

35. The method of claim 31, wherein processing the at least one vehicle lamp output comprises sequentially controlling a state of a plurality of outputs with respect to each of a plurality of vehicle lamps.

36. The method of claim 35, wherein sequentially controlling the state of the plurality of outputs comprises sequentially activating each of the plurality of vehicle lamps.

37. The method of claim 31, processing the at least one vehicle lamp output comprises providing a pulsed current output to a vehicle headlamp, the pulsed current output gradually decreasing an off state frequency over a predetermined period of time to eventually provide a substantially DC current to the vehicle headlamp.

38. The method of claim 31, wherein processing the at least one vehicle lamp output comprises:

deactivating the at least one vehicle lamp output upon the electrical signal associated with the at least one vehicle lamp output exceeding a respective over-current condition threshold; and reactivating the at least one vehicle lamp output upon expiration of a set time associated with a fault timer, the set time being based on a magnitude of the electrical signal associated with the at least one vehicle lamp output.

39. The method of claim 31, wherein processing the at least one vehicle lamp output comprises:

continuously monitoring a magnitude of voltage associated with the at least one vehicle lamp output;

signaling a short circuit fault associated with the at least one vehicle lamp output upon detecting a short circuit condition based on at least one of a magnitude of current and the magnitude of voltage associated with the at least one vehicle lamp output; and signaling an open circuit fault associated with the at least one vehicle lamp output upon detecting an open circuit condition based on at least one of the magnitude of current and the magnitude of voltage associated with the at least one vehicle lamp output.

40. The method of claim 31, wherein the at least one user request is a first user request associated with changing a present illumination mode associated with the plurality of vehicle lamps from a first illumination mode to a second illumination mode, the method further comprising:

monitoring the user interface for a verification command provided by the user associated with verifying the change from the first illumination mode to the second illumination mode;

selecting a third illumination mode as the present illumination mode based on a second input by the user prior to receiving the verification command associated with verifying the change from the first illumination mode to the second illumination mode; and setting the third illumination mode as the present illumination mode upon receiving a verification command provided by the user associated with verifying the change from the first illumination mode to the third illumination mode.

* * * * *